US011812500B2

(12) United States Patent
Qi et al.

(10) Patent No.: US 11,812,500 B2
(45) Date of Patent: *Nov. 7, 2023

(54) ENHANCED BLUETOOTH MECHANISM FOR TRIGGERING WI-FI RADIOS

(71) Applicant: Intel Corporation, Santa Clara, CA (US)

(72) Inventors: Emily H. Qi, Gig Harbor, WA (US); Carlos Cordeiro, Portland, OR (US); Robert D. Hughes, Tualatin, OR (US); Elad Oren, Tel Aviv (IL); Ehud Reshef, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,602

(22) Filed: Oct. 31, 2022

(65) Prior Publication Data

US 2023/0060773 A1 Mar. 2, 2023

Related U.S. Application Data

(63) Continuation of application No. 17/184,519, filed on Feb. 24, 2021, now Pat. No. 11,490,242, which is a (Continued)

(51) Int. Cl.
*H04W 8/00* (2009.01)
*H04W 52/02* (2009.01)
(Continued)

(52) U.S. Cl.
CPC ............. *H04W 8/005* (2013.01); *H04L 67/51* (2022.05); *H04L 69/22* (2013.01); *H04W 4/80* (2018.02);
(Continued)

(58) Field of Classification Search
CPC ....... H04W 8/005; H04W 4/80; H04W 48/10; H04W 48/16; H04W 52/0261
See application file for complete search history.

(56) References Cited

U.S. PATENT DOCUMENTS

| | | | | |
|---|---|---|---|---|
| 2013/0165044 A1* | 6/2013 | Xie | ........................ | H04W 8/005 455/41.2 |
| 2014/0355517 A1* | 12/2014 | Reunamaki | ........... | H04W 8/005 370/328 |

(Continued)

*Primary Examiner* — Jael M Ulysse
(74) *Attorney, Agent, or Firm* — Eversheds Sutherland (US) LLP

(57) ABSTRACT

This disclosure describes methods, apparatus, and systems related to enhanced Bluetooth triggering of device Wi-Fi radios. A device may determine a first Bluetooth data packet including transport data and an indication of a Wi-Fi service discovery, the transport data including a first sub-field and a second sub-field, the first sub-field indicating a length of the second sub-field, and the second sub-field indicating one or more Wi-Fi services supported by the device. A Bluetooth radio of the device may send the first Bluetooth data packet including an indication of a Wi-Fi service. The device may identify a second Bluetooth data packet received by the Bluetooth radio from a second device, the second Bluetooth data packet indicating that the Wi-Fi service is supported by the second device. The device may use a Wi-Fi radio to send one or more Wi-Fi frames associated with the Wi-Fi service to the second device.

20 Claims, 9 Drawing Sheets

Related U.S. Application Data continuation of application No. 16/199,931, filed on Nov. 26, 2018, now abandoned.

(60) Provisional application No. 62/591,014, filed on Nov. 27, 2017.

(51) Int. Cl.
| | | |
|---|---|---|
| *H04W 48/10* | (2009.01) | |
| *H04W 48/16* | (2009.01) | |
| *H04W 4/80* | (2018.01) | |
| *H04L 69/22* | (2022.01) | |
| *H04L 67/51* | (2022.01) | |
| *H04W 48/08* | (2009.01) | |

(52) U.S. Cl.
CPC ........... *H04W 48/10* (2013.01); *H04W 48/16* (2013.01); *H04W 52/0261* (2013.01); *H04W 48/08* (2013.01)

(56) References Cited

U.S. PATENT DOCUMENTS

| | | | |
|---|---|---|---|
| 2015/0172391 A1* | 6/2015 | Kasslin | H04W 8/005 |
| | | | 370/338 |
| 2015/0172901 A1* | 6/2015 | Kasslin | H04W 8/005 |
| | | | 370/328 |
| 2016/0234301 A1* | 8/2016 | Qi | H04W 8/005 |
| 2016/0302026 A1* | 10/2016 | Lee | H04W 8/005 |
| 2016/0353233 A1* | 12/2016 | Yong | H04L 67/51 |
| 2017/0164186 A1* | 6/2017 | Yong | H04W 76/14 |
| 2019/0141786 A1* | 5/2019 | Park | H04W 92/18 |
| 2019/0150062 A1* | 5/2019 | Bradley | H04W 48/08 |
| | | | 370/254 |

* cited by examiner

ENHANCED BLUETOOTH MECHANISM FOR TRIGGERING WI-FI RADIOS

CROSS-REFERENCE TO RELATED APPLICATION(S)

This application is a Continuation of U.S. Non-Provisional application Ser. No. 17/184,519, filed Feb. 24, 2021, which is a Continuation of U.S. Non-Provisional application Ser. No. 16/199,931, filed Nov. 26, 2018, which claims the benefit of U.S. Provisional Application No. 62/591,014, filed Nov. 27, 2017, the disclosures of which are incorporated by reference as if set forth in full.

TECHNICAL FIELD

This disclosure generally relates to systems and methods for wireless communications and, more particularly, to enhanced Bluetooth mechanisms for triggering Wi-Fi radios.

BACKGROUND

Wireless devices are becoming widely prevalent, and efficient power consumption of wireless devices is becoming more important. Wireless communication devices may consume power using different types of operations.

DETAILED DESCRIPTION

Figure 1:
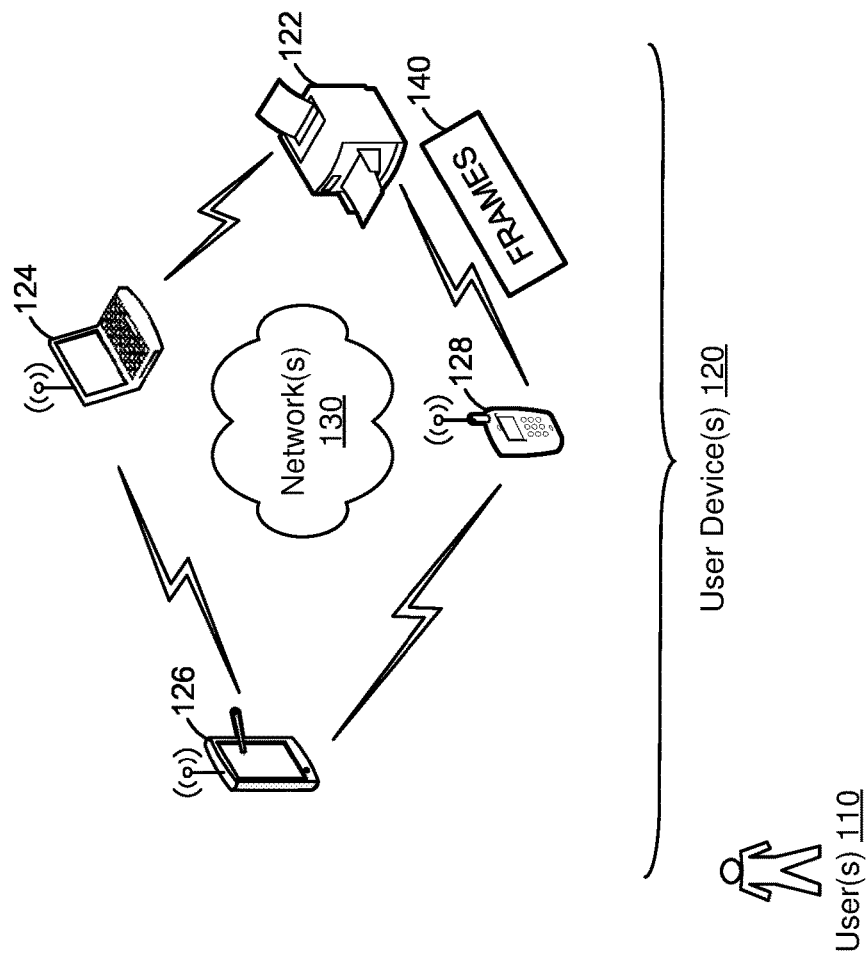
FIG. 1 depicts a network diagram illustrating an example network environment, according to one or more example embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

With the emergence of applications around social networking, Internet of Things (IoT), wireless docking, and other wireless technologies, extremely low power solutions may allow device hardware to be on at any time and may facilitate wireless communications, such as service discovery, in a power efficient manner. Both Wi-Fi and Bluetooth communications have service discovery processes distinct from one another. Wi-Fi services are services provided by Wi-Fi radio. Wi-Fi service discovery may use Wi-Fi radios to exchange Wi-Fi frames requesting and confirming device support of services by Wi-Fi radio, while Bluetooth discovery (e.g., Bluetooth service discovery) may use Bluetooth radios to exchange Bluetooth frames requesting and confirming device support of services provided by Bluetooth radio. Different services may use communication links with communication interfaces designed for the specific type of communication (e.g., Wi-Fi interfaces for Wi-Fi communications, Bluetooth interfaces for Bluetooth communications). Wi-Fi and Bluetooth communications use different radios and different hardware and software to support those radios. A message designed to be decoded and processed by a Wi-Fi radio may be different from a message designed to be decoded and processed by a Bluetooth radio, for example, so the messages designed for one communication method may not be properly recognized and decoded by hardware and software of a different communication method, and even if the messages are properly recognized and decoded, they may include information which causes no use of the radio of the other communication method, resulting in a waste of resources.

In Wi-Fi, neighbor aware networking (NAN) and other types of Wi-Fi interfaces may use a background, low-power Wi-Fi device and service discovery mechanism. In Bluetooth communications, Bluetooth Low Energy (BLE) frame formats may assist service and device discovery for other transport technologies outside Bluetooth. For example, a Bluetooth packet may be adapted to provide power-efficient Wi-Fi communications. An enhanced frame format may be adopted from the BLE Transport Discovery Service (TDS) technical specification, for example, and may trigger Wi-Fi radios (e.g., for use in NAN, Wi-Fi Direct/peer-to-peer, Wi-Fi AP infrastructure, WiGig, HaLow, and other types of Wi-Fi) in a more power-efficient manner than the use of existing Wi-Fi frames. For example, for Wi-Fi service discovery, devices may use an exchange of messages to determine when to turn on a Wi-Fi radio, and may exchange messages using the Wi-Fi radio to establish a Wi-Fi link with another device to communicate messages associated with a service. To save power and time, devices may use active Bluetooth radios to send and receive messages which may be used to activate Wi-Fi radios for service discovery.

Because frames for Wi-Fi communications may be designed for different radios supported by different hardware and logic than frames designed for Bluetooth communication, an adaptation of a Bluetooth frame for use in Wi-Fi communications may include a more flexible frame format to account for Wi-Fi service discovery and to account for which types of radios are using certain channels so that, for example, a Bluetooth radio may be aware of the channel operations of a Wi-Fi radio. For example, simply using an existing Bluetooth frame without modification may not cause the activation of a Wi-Fi radio on a device because a Wi-Fi radio may not identify and decode the Bluetooth frame properly, and may waste power and processing resources as Bluetooth radios may decode the frame only to determine that it is not intended for a Bluetooth radio. Therefore, some modifications to an existing Bluetooth frame may be required for power-efficient activation of a Wi-Fi radio.

In the BLE TDS transport discovery data advertisement data (AD) type packet format (e.g., as defined by the Bluetooth Transport Discovery Service technical standard, 2015), a few bytes (e.g., 26 bytes) of information may be carried in a packet using BLE radio (e.g., the limited number of bytes may allow for low-power operations). Because Wi-Fi communications may include additional/different information than what may be in the BLE TDS transport discovery data AD type packet, the adaptation of the Bluetooth packet may include modifications to the existing frame format to allow the adapted packet to carry specific/sufficient information to cause initiation of a Wi-Fi radio and to operate in the proper spectrum applicable to Wi-Fi applications. The adapted frame format also may address encoding and decoding processes and power consumption specific to Wi-Fi communications.

In Bluetooth communications, the transport discovery data AD type packet enables a client device to determine a role of a device, such as whether a device is a service seeker or service provider. The transport discovery data AD type packet may include an AD length field, a transport discovery data AD type field, an organization identifier field, a transport discovery service (TDS) flags field, a transport data length field, and a transport data field. One or more fields of the transport discovery data AD type packet may be modified to provide information which may activate a Wi-Fi radio. For example, the transport data field may include identifiers of different services requested/supported by a device. Devices which establish matching Bluetooth services may establish Bluetooth links to exchange messages for those services. However, the messages and links used for Bluetooth may not work for Wi-Fi communications due to different spectrums, message formats, hardware, software, logic, or other variations.

One way to modify the transport discovery data AD type packet for use in Wi-Fi communications is to include a Bloom Filter (BF) sub-field in the transport data field of the transport discovery data AD type packet. The BF field may include a set of bit positions that are set to "1" after hashing elements by the BF. An element may be included in the packet to indicate a service type, link identifier, and/or type of operation (e.g., subscribe, publish, or other types of operations). A BLE device address may be included in messages to identify the receiving BLE device so that the receiving BLE device may identify that the Bluetooth packet is intended for the receiving device and causes the receiving device to turn on its Wi-Fi radio.

However, in some proposed Bluetooth packet formats, a specific way to determine the BF field length and calculation may be missing, which may result in different BF size outputs (e.g., 8-26 bytes). Without knowing the length of a BF sub-field, for example, a receiving device may not be configured properly to decode the packet.

Because a BLE TDS AD packet may be a broadcast (e.g., so any device with an active Bluetooth radio may receive the packet), including a BLE device address (BDA) may allow an intended recipient BLE device to respond and turn on its Wi-Fi radio. However, including a BDA in an element (e.g., a BF sub-field) of a packet field may result in Bluetooth-enabled devices having to decode entire fields/sub-fields to determine whether a packet is intended for them rather than identifying recipient address information in advance. Decoding an entire transport data field, for example, to identify whether a message is intended for a device may be time and power consuming.

In some Wi-Fi operations, a regulatory class and channel number may be predefined or a Wi-Fi device may be operating on a channel. Without the channel information (e.g., regulatory class and channel number) for Wi-Fi operations, a Wi-Fi radio may have to scan all possible channels for availability, which may be both time and energy consuming. Also, a Bluetooth radio may benefit from knowing which channels a device may be using for Wi-Fi communications. However, some proposed Bluetooth packet formats fail to provide sufficient information to facilitate low-power, fast activation of a Wi-Fi radio on a device, and may not consider scenarios when a service provider device's Wi-Fi link is already active.

Example embodiments described herein provide certain methods, devices, and systems for enhanced Bluetooth mechanisms for triggering Wi-Fi radios.

In one or more embodiments, an enhanced Bluetooth packet may include an adaptation of an existing Bluetooth data packet (e.g., a BLE TDS AD packet) to provide a more flexible format of the packet for use in activating a Wi-Fi link or another type of radio (e.g., non-Bluetooth radio). The flexible packet format may allow devices to exchange essential information to start Wi-Fi operations, reduce power consumption for surrounding devices, reduce the computational requirements of devices, and shorten discovery time if a device's Wi-Fi link is already on. For example, a BF field may be included in the transport data field of a BLE TDS AD packet, along with additional information including a device address, channel information, a control flag/header, and a link status. By adding a BLE device address or subset as a new optional field instead of a component in an element in a BF of the transport data field, for example, device resources may be conserved by not requiring Bluetooth-enabled devices to decode the entire transport data field to determine whether a packet is intended for a particular device.

In one or more embodiments, a Bluetooth data packet may be adapted for power-efficient Wi-Fi communications by including an indication of a Wi-Fi organization/service. For example, an organization identifier field of a BLE TDS AD packet may indicate a Bluetooth organization/service or a Wi-Fi organization/service, such as a Wi-Fi service discovery process.

In one or more embodiments, a Bluetooth data packet may be adapted for Wi-Fi communications by including a header which may indicate a length of a BF in the data packet and/or whether channel information for Wi-Fi communications is included in the data packet. If the channel information is indicated as present in the data packet, a channel information may be included in the data packet. The channel information field may include indications of an operating class and channel number for Wi-Fi services.

In one or more embodiments, a Bluetooth data packet may be adapted for power-efficient Wi-Fi communications by including a BF sub-field in a transport data field. The BF sub-field may include a set of bit positions set to 1 after hashing BF elements. BF elements may be case-sensitive text strings describing Wi-Fi services offered/supported by a device, discovery searches, and/or services being activated by a device. The strings may indicate an operation, parameters, a name of a Wi-Fi service, and a data link identifier. Operations may include at least one of a device-specific activation, a request to activate a data link based on an indication that the Wi-Fi service is supported by the second device, a provider of the Wi-Fi service, or a request for the Wi-Fi service without causing activation of the data link based on an indication that the Wi-Fi service is supported by the second device. The parameters may include a BLE address of a device. The service name may uniquely identify a service and may be encoded. An identifier of a data link may be a text string used to indicate a data link offered for the service (e.g., "nan" may represent a NAN data link). For example, if "ipp. tcp" is used as a service name, a service seeking device seeking a NAN service may advertise "s: ipp. tcp%nan."

In one or more embodiments, a Bluetooth data packet may be adapted for power-efficient Wi-Fi communications by including a BLE device address sub-field in a transport data field. The BLE device address may indicate an address associated with the device intended to receive the Bluetooth data packet. A receiving device may identify that the data packet is intended for it and may process the data packet, or may identify that the data packet is intended for another device and may stop processing the data packet.

In one or more embodiments, a Bluetooth data packet may be adapted for power-efficient Wi-Fi communications by including a link status sub-field in a transport data field. The link status sub-field may indicate that a Wi-Fi radio/interface/link is on/active (e.g., for NAN, peer-to-peer, Wi-Fi Infrastructure, and other types of Wi-Fi).

In one or more embodiments, a Bluetooth data packet may be adapted for power-efficient Wi-Fi communications by including the sub-fields indicated below in Table 1 in a transport data field.

TABLE 1

Sub-fields in a Transport Data Field.

| Field Name | Length (Octets) | Description |
| --- | --- | --- |
| Control Flag | 2 | B0-B4: Set to a value to indicate the length of Bloom filter field. The value is from 0 to 24. <br> B5: set to 1 to indicate BLE Device Address field is present. Otherwise, set to 0. <br> B6: set to 1 to indicate Channel Information field is present. Otherwise, set to 0. <br> B7: set to 1 to indicate Link Status field is present. Otherwise, set to 0. <br> B8 to B15: reserved |
| Bloom Filter | 8 to 24 | The Bloom Filter (BF) field contains a set of bit positions that are set to "1" after hashing elements by the BF. An element which consists of service type, and link identifier and type of operation (publish or subscribe). |
| BLE Device Address | 2 | The Lower two bytes of BLE Device Address. Note that another option is to include full 6 bytes address. |
| Channel Information | 2 | Indicate regulatory class and channel number. |
| Link Status | 1 | B0: Set to 1 indicate that NAN link is on. Otherwise, set to 0. <br> B1: Set to 1 indicate that P2P link is on. Otherwise, set to 0. <br> B2: Set to 2 indicate that WiFi Infrastructure link is on. Otherwise, set to 0. <br> B3 to B7: reserved. |

TABLE 1-continued

Sub-fields in a Transport Data Field.

| Field Name | Length (Octets) | Description |
| --- | --- | --- |

In one or more embodiments, a seeker device may send a service discovery request using a Bluetooth data packet (e.g., an enhanced BLE TDS AD packet modified for Wi-Fi communications) indicating one or more requested Wi-Fi service names and associated types of data links (e.g., NAN, Wi-Fi P2P, Wi-Fi infrastructure, and other types of Wi-Fi) for the services. A provider device may receive the data packet and determine that the service name is supported by the provider device. The provider device may respond by sending a Bluetooth data packet indicating one or more matching services (e.g., services indicated in the service discovery request and supported by the provider device) and supported data links for the services. The seeker device may send a seeker connect Bluetooth data packet indicating one or more services and data links, and including the Bluetooth device address of the provider device so that the provider device may identify that the seeker connect packet is intended for that provider device. The provider device may activate an interface for the service/data link (e.g., if the service and data link are NAN, the provider device may activate a NAN interface). The provider device may send a provider connect response data packet indicating the service, data link, and the Bluetooth device address of the seeker device. The seeker device may activate an interface for the service/data link (e.g., if the service and data link are NAN, the provider device may activate a NAN interface). Once the Wi-Fi radios and interfaces on the seeker and provider devices are activated for a service, the seeker and provider devices may exchange service discovery request and response frames in a Wi-Fi service discovery process as defined by the IEEE 802.11 technical standards (e.g., a NAN service discovery process).

In one or more embodiments, the service discovery process may be enhanced by using a modified Bluetooth data packet, which may result in fewer exchanges of messages and less consumed device resources. For example, a seeker device may send a service discovery request using a Bluetooth data packet (e.g., an enhanced BLE TDS AD packet modified for Wi-Fi communications) indicating one or more requested Wi-Fi service names and associated types of data links (e.g., NAN, peer-to-peer, Wi-Fi infrastructure, and other types of Wi-Fi) for the services. A provider device may receive the data packet and determine that the service name is supported by the provider device. The provider device may respond by sending a Bluetooth data packet indicating one or more matching services (e.g., services indicated in the service discovery request and supported by the provider device) and supported data links for the services. If the corresponding Wi-Fi interface of the provider device is not already activated, the provider device may activate the interface. The seeker device may receive the indication of a matching service and data link, and may activate the corresponding Wi-Fi interface and data link. If necessary, the seeker device may send another data packet indicating its activated interface/data link to the provider device. Once the Wi-Fi radios and interfaces on the seeker and provider devices are activated for a service, the seeker and provider devices may exchange service discovery request and response frames in a Wi-Fi service discovery process as defined by the IEEE 802.11 technical standards (e.g., a NAN service discovery process). By defining a BF sub-field length of the data packets (e.g., an enhanced BLE TDS AD packet modified for Wi-Fi communications) and using a BF sub-field in a transport data field of the data packet, the seeker and provider devices may require fewer exchanges of messages and increase power efficiency to activate Wi-Fi radios using other types of radios, such as Bluetooth.

The above descriptions are for purposes of illustration and are not meant to be limiting. Numerous other examples, configurations, and processes, etc., may exist, some of which are described in greater detail below. Example embodiments will now be described with reference to the accompanying figures.

FIG. 1 is a network diagram illustrating an example network environment, according to some example embodiments of the present disclosure.

Wireless network 100 can include one or more user devices 120 (e.g., 122, 124, 126, or 128), which may communicate in accordance with wireless standards, such as the IEEE 802.11 communication standards, Bluetooth communication standards, or Wi-Fi Alliance technical specification such as, the NAN specification over network(s) 130. In one embodiment, the one or more user devices 120 may be utilized by one or more user(s) 110 for wireless communications in accordance with IEEE 802.11 communication standards. For example, the user devices 120 may be NAN devices that may perform connectivity procedures with one another to set up a NAN data path. In one embodiment, the user devices 120 may utilize a NAN data path (NDP) negotiation procedure defined to enable data transmission between two NAN devices. This negotiation procedure may be an associative process (similar to an Access Point-Station (AP-STA) process in a typical Wi-Fi infrastructure. In Wi-Fi, a station which exchanges data (e.g., a transmitting station) with another station (e.g., receiving station), should ensure that a potential interferer would not transmit at the same time and interfere with the data exchange.

Figure 7:
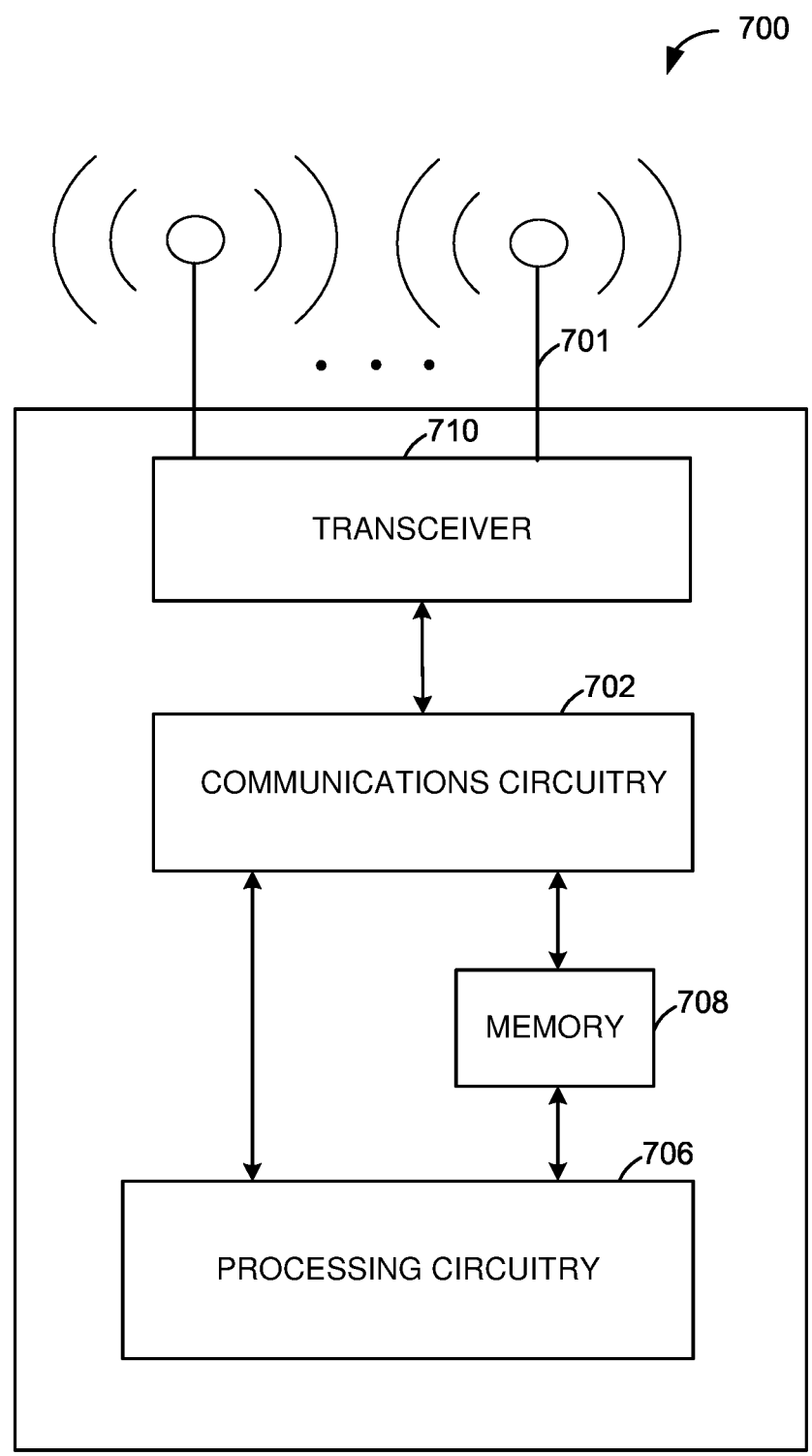
FIG. 7 illustrates a functional diagram of an example communication station that may be suitable for use as a user device, in accordance with one or more example embodiments of the disclosure.
Figure 8:
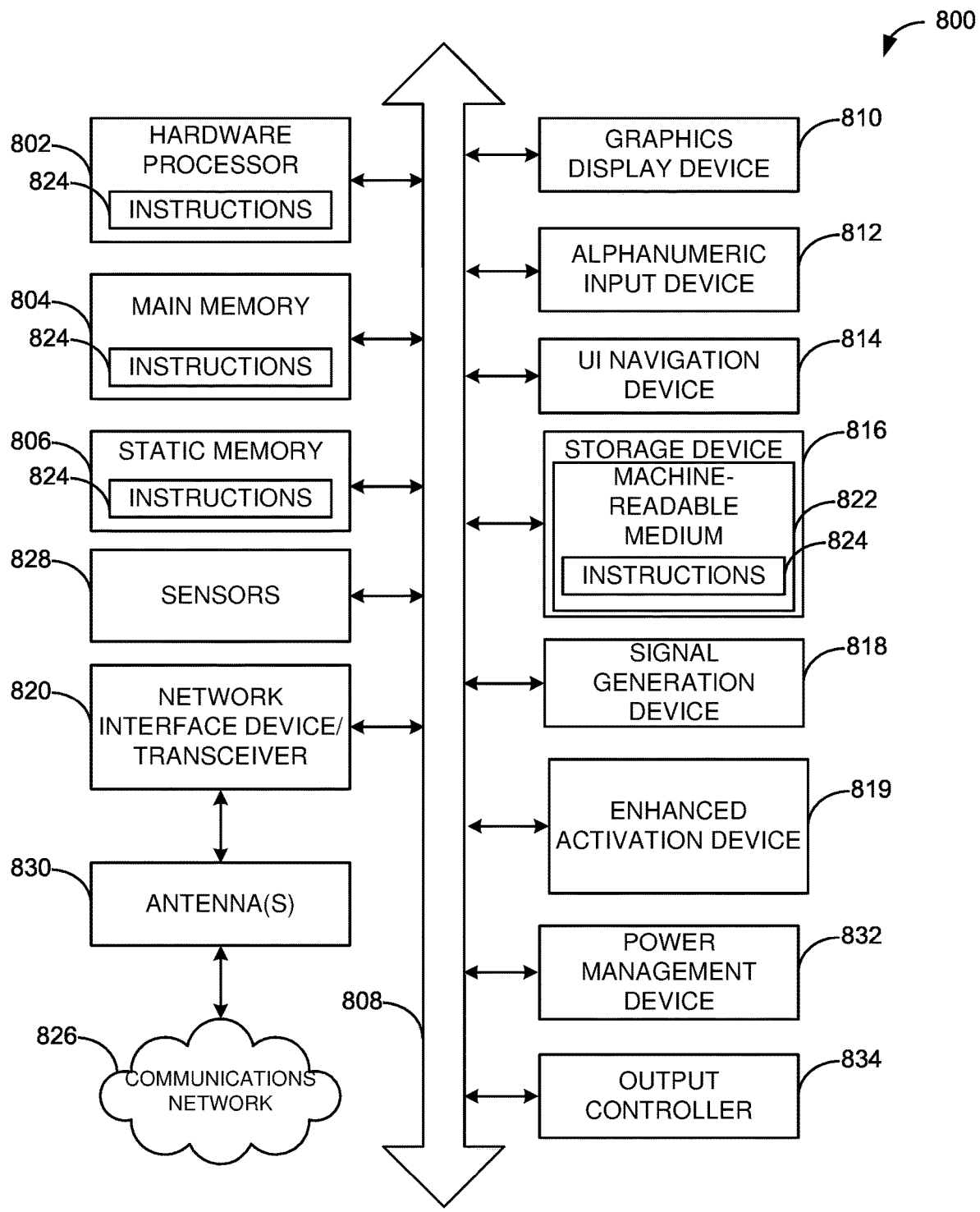
FIG. 8 is a block diagram of an example machine upon which any of one or more techniques (e.g., methods) may be performed, in accordance with one or more embodiments of the disclosure.

In some embodiments, the one or more user devices 120 may include one or more computer systems similar to that of the functional diagram of FIG. 7 and/or the example machine/system of FIG. 8.

One or more illustrative user device(s) 120 may be operable by one or more user(s) 110. The user device(s) 120 (e.g., 122, 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.), and so forth.

Any of the user devices 120 (e.g., 122, 124, 126, or 128) may be configured to communicate with each other and any other component of the wireless network 100 directly and/or via the one or more communications networks 130, wirelessly or wired.

Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi Direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

In one embodiment, and with reference to FIG. 1, the one or more user devices 120 may be configured to communicate one another. The one or more user devices 120 may function as APs and/or STAs, and may exchange frames 140. For example, frames 140 may be sent by different types of radios. For example, a Bluetooth radio may send frames 140 which may cause activation of a Wi-Fi radio. The frames 140 may be used in a service discovery process or another process.

Figure 2:
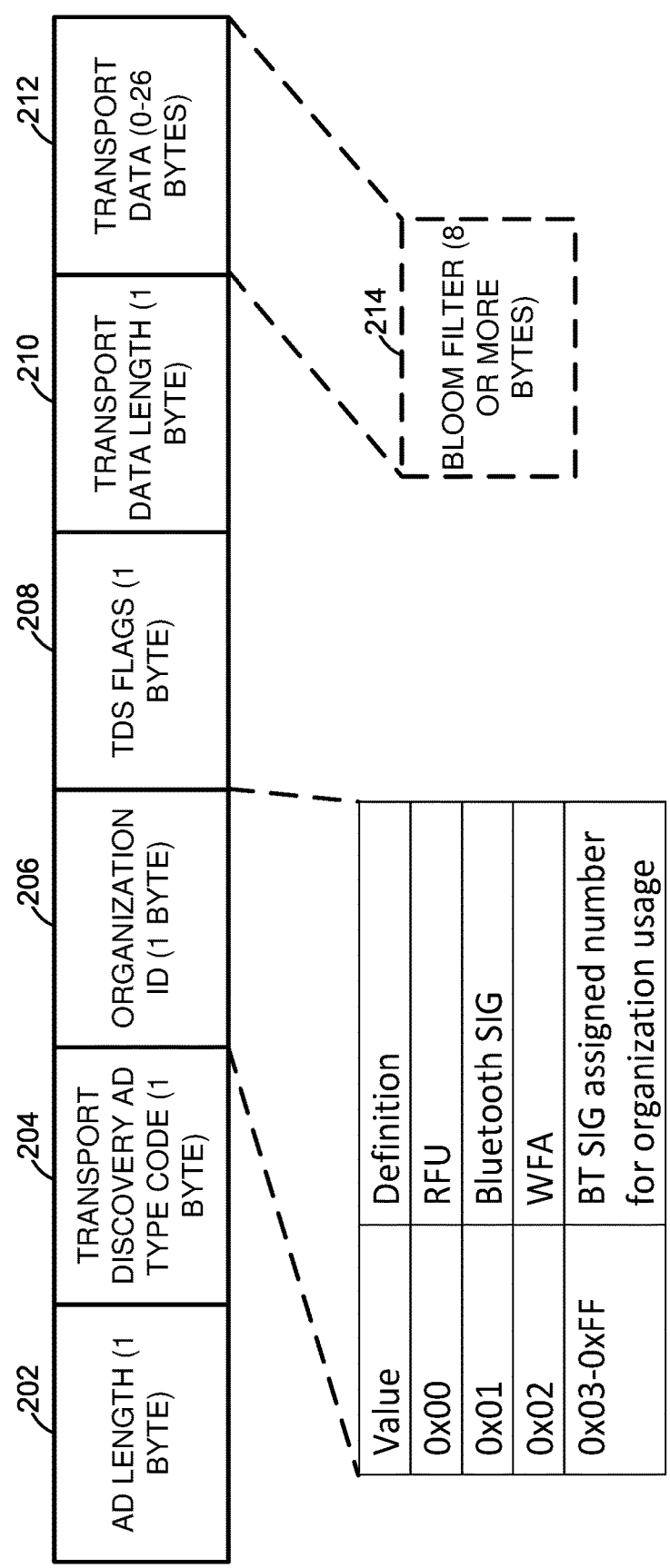
FIG. 2 illustrates a portion of Bluetooth data packet, in accordance with one or more example embodiments of the present disclosure.

FIG. 2 illustrates a portion 200 of a Bluetooth data packet, in accordance with one or more example embodiments of the present disclosure.

Referring to FIG. 2, the portion 200 may include an AD length field 202, a transport discovery AD type code field 204, an organization identifier (ID) field 206, a transport discovery service (TDS) flags field 208, a transport data length field 210, and a transport data field 212. The transport data field 212 may include a BF sub-field 214. The AD length field 202 may use 1 byte. The transport discovery AD type code field 204 may use 1 byte. The organization ID field 206 may use 1 byte. The TDS flags field 208 may use one byte. The transport data length field 210 may use one byte. The transport data field 212 may use 0-26 bytes. The BF sub-field 214 may use 8 or more bytes. The fields and sub-fields of the portion 200 therefore may use 5-31 bytes, or may use another number of bytes for their respective fields. The portion 200 may be part of a transport discovery AD type which enables a device to determine a role (e.g., seeker or provider), an organization and transport (e.g., a Bluetooth organization or Wi-Fi organization) associated with a supported service, among other details. The portion 200 may be included in advertising data packet (e.g., a BLE TDS transport discovery data AD packet) and/or in an extended response packet.

The AD length field 202 may use one byte to indicate a length of the portion 200. The length of the portion 200 may be used by a device receiving the portion 200 to determine the number of bytes to be decoded. The organization ID field 206 may indicate an organization associated with the portion 200, such a Bluetooth (e.g., Bluetooth SIG) Wi-Fi (e.g., Wi-Fi Alliance WFA), RFU, and other types of wireless communications. Multiple wireless communication services (e.g., printing, file/data sharing, and other types of wireless services) related to a same or more multiple organizations may be advertised in a same packet using the portion 200. The TDS flags field 208 may indicate a role of a device and information about a device's state and supported features (e.g., a seeker, a provider, a seeker and a provider, whether transport data is complete or incomplete, whether a transport state may accept a connection for a particular service). Because the transport data field 212 may be variable in length, the transport data length field 210 may indicate the length of the transport data field 212 so that a device receiving the portion 200 may determine the length of the transport data field 212, including indicating whether the transport data field 212 is present or not. The transport data field 212 may indicate (e.g., optionally using the BF sub-field 214) service identifiers indicating requested/supported services, which may be listed in order of preference or priority. If multiple services are requested or indicated as available, the portion 200 may be repeated (or at least sub-portions of the portion 200).

Figure 3:
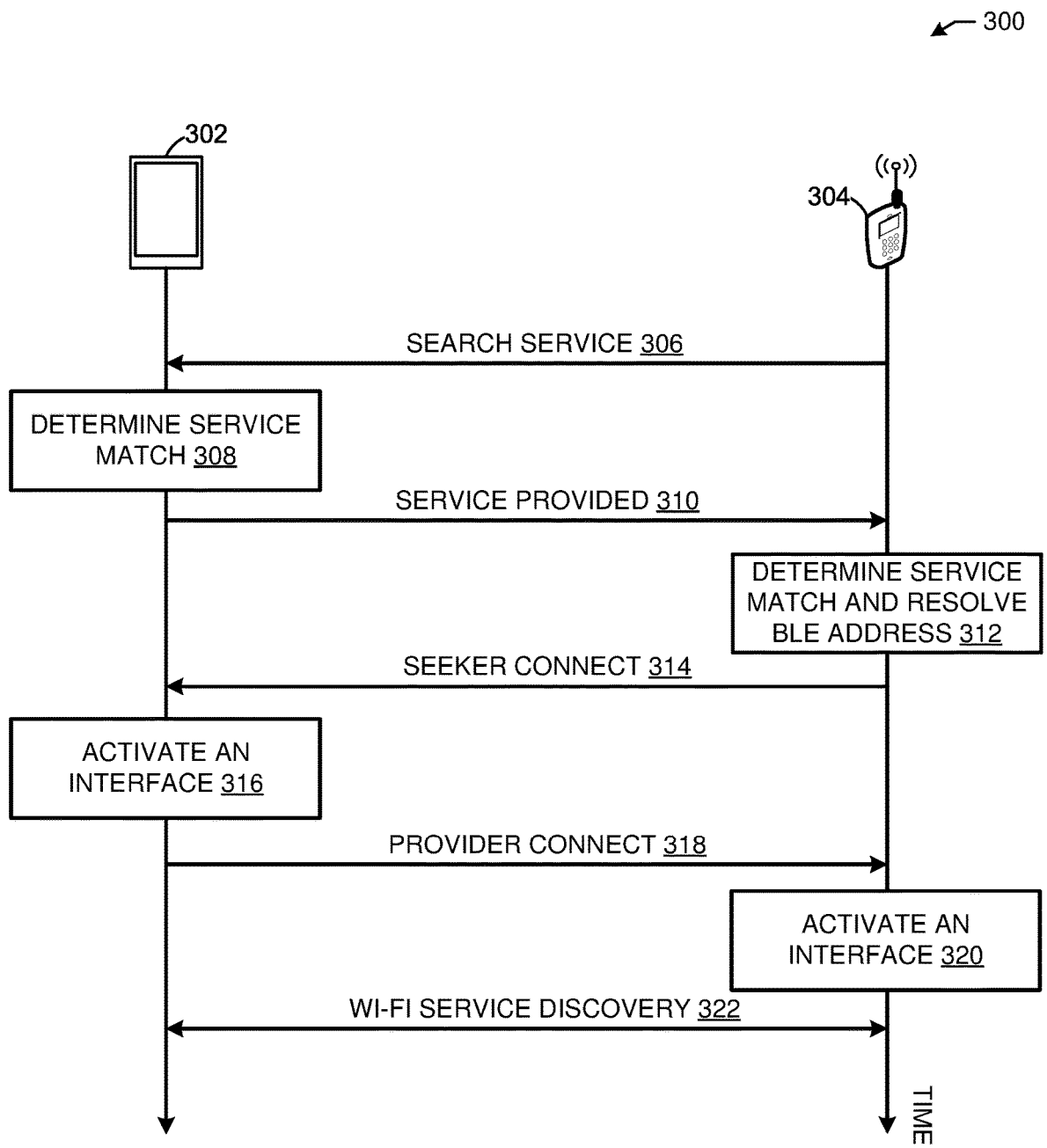
FIG. 3 illustrates an enhanced low-power Wi-Fi service discovery operation, in accordance with one or more example embodiments of the present disclosure.

FIG. 3 illustrates an enhanced low-power Wi-Fi service discovery operation 300, in accordance with one or more example embodiments of the present disclosure.

Referring to FIG. 3, a provider device 302 may establish communication with a seeker device 304 to communicate packets (e.g., frames 140 of FIG. 1) associated with a service. The provider device 302 and the seeker device 304 may be Bluetooth-enabled. The seeker device 304 may send a search service request 306, such as a Bluetooth packet (e.g., a BLE TDS transport discovery data AD packet with the portion 200 of FIG. 2) indicating a service and a type of data link (e.g., a Wi-Fi service and a Wi-Fi data link). At step 308, the provider device 302 may determine a service match, for example, by identifying a service supported by the provider device 302 and matching a service indicated by the search service request 306. The provider device 302 may send a service provided response 310 to the seeker device 304. The service provided response 310 may indicate that the provider device 302 supports a requested service and data link for the service (e.g., a Wi-Fi service and a Wi-Fi data link). The seeker device 304 may determine, at step 312, that the requested service is matched (e.g., supported by the provider device 302) and may resolve the BLE address of the provider device 302. The seeker device 304 may send a seeker connect request 314 addressed to the provider device 302 and indicating the matched service and data link. The provider device 302 may, at step 316, activate one or more interfaces (e.g., a Wi-Fi interface such as NAN, peer-to-peer, or any other interface between two devices). The provider device 302 may send a provider connect response 318 addressed to the seeker device 304, indicating the Wi-Fi service and activated Wi-Fi interface. At step 320, the seeker device 304 may activate an interface (e.g., a Wi-Fi interface such as NAN, peer-to-peer, or any other interface between two devices). Once the provider device 302 and the seeker device 304 have established a matching Wi-Fi service and data link using Bluetooth packet transmissions, the provider device 302 and seeker device 304 may execute Wi-Fi service discovery at step 322 (e.g., as defined by an IEEE 802.11 standard, a NAN specification, or another Wi-Fi technical specification).

The Bluetooth packet exchange of the enhanced low-power Wi-Fi service discovery operation 300 may include four exchanges (e.g., the search service request 306, the service provided response 310, the seeker connect request 314, and the provider connect response 318) using Bluetooth communication to activate Wi-Fi interfaces and radios on two devices (e.g., the provider device 302 and the seeker device 304) before performing Wi-Fi service discovery operations. If a requested Wi-Fi service is indicated using a BF sub-field (e.g., BF sub-field 214 of FIG. 2), the length of the BF sub-field may vary (e.g., from 8-26 bits). A receiving device (e.g., the provider device 302) may benefit from an indication of the BF sub-field length so that the receiving device may decode a service request properly. In addition, a Wi-Fi channel indication may indicate to a receiving device which channel to use for a Wi-Fi service rather than a device having to scan multiple or all channels for Wi-Fi service availability.

Figure 4:
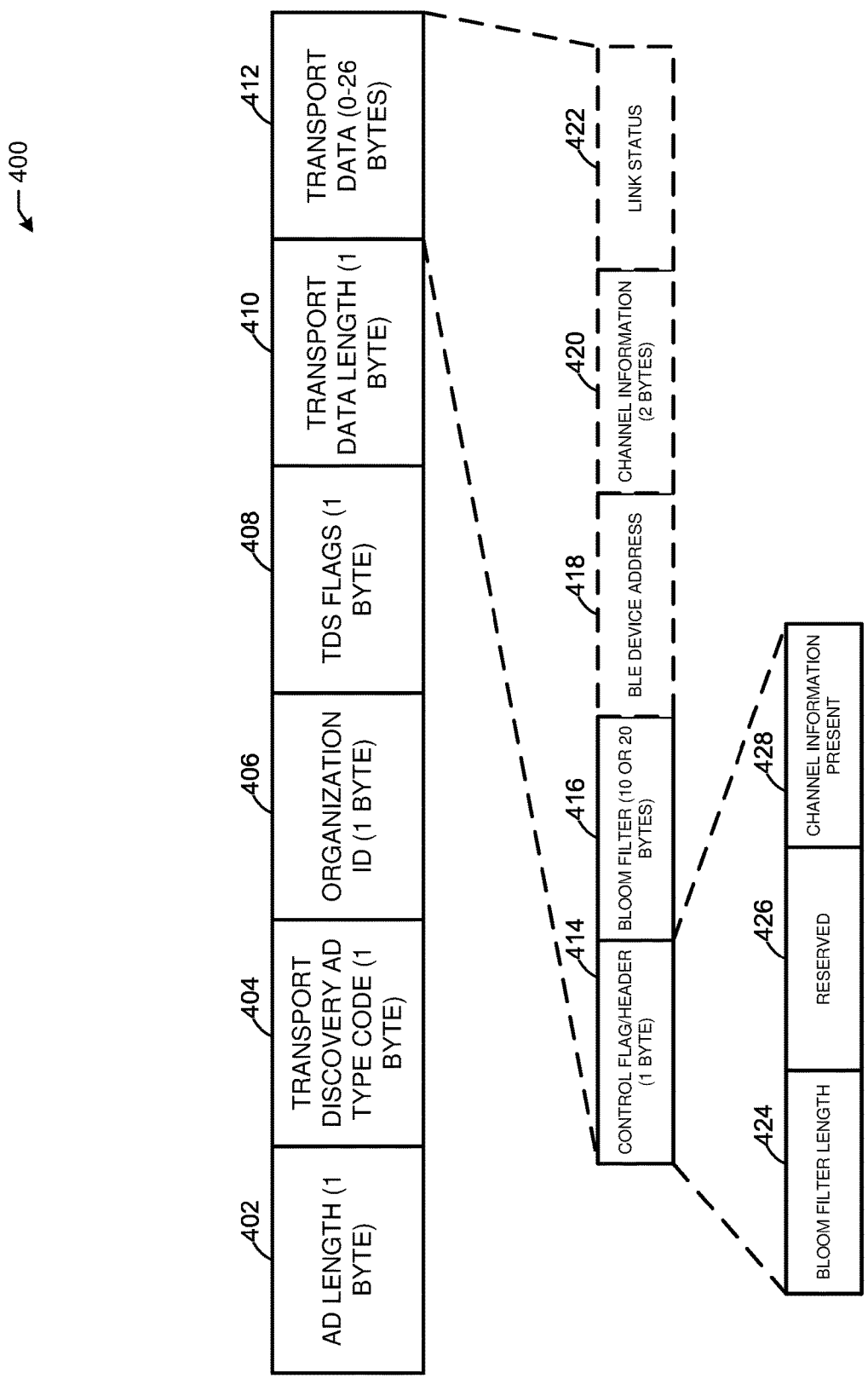
FIG. 4 illustrates a portion of an enhanced Bluetooth data packet for triggering a Wi-Fi radio, in accordance with one or more example embodiments of the present disclosure.

FIG. 4 illustrates a portion 400 of an enhanced Bluetooth data packet for triggering a Wi-Fi radio, in accordance with one or more example embodiments of the present disclosure.

Referring to FIG. 4, the portion 400 may include an AD length field 402, a transport discovery AD type code field 404, an organization identifier (ID) field 406, a transport discovery service (TDS) flags field 408, a transport data length field 410, and a transport data field 412. The transport data field 412 may include one or more sub-fields, such as a control flag/header 414, a BF 416, a BLE device address 418, channel information 420, and link status 422. The BLE device address 418, the channel information 420, and the link status 422 may be optional sub-fields. The control flag/header 414 may include one or more additional sub-fields, such as a BF length 424, reserved bits 426, and a channel information present indicator 428. The AD length field 402 may use 1 byte. The transport discovery AD type code field 404 may use 1 byte. The organization ID field 406 may use 1 byte. The TDS flags field 408 may use one byte. The transport data length field 410 may use one byte. The transport data field 412 may use 0-26 bytes. The control flag/header 414 may use 1 byte. The BF 416 may use a variable number of bytes (e.g., 10 or 20 bytes). The channel information 420 may use 2 bytes. The portion 400 may be part of a transport discovery AD type which enables a device to determine a role (e.g., seeker or provider), an organization and transport (e.g., a Bluetooth organization or Wi-Fi organization) associated with a supported service, among other details. The portion 400 may be included in advertising data packet (e.g., a BLE TDS transport discovery data AD packet) and/or in an extended response packet.

The portion 400 may provide a flexible packet/frame format to allow Bluetooth-enabled devices to exchange information to initiate a Wi-Fi operation, reduce power consumption for surrounding devices, reduce computational requirements of devices, and shorten service discovery time if a device Wi-Fi link is already on. The sub-fields of the transport data field 412 may be defined above in Table 1. The BF 416 may include 8-24 or some other number of bytes, and the number of bytes may vary based on the Wi-Fi service, Wi-Fi link, and the type of operation identified. Such is one reason why a Bluetooth data packet may require modifications to cause activation of Wi-Fi radios beyond adding information to a Bluetooth data packet. The receiving device (e.g., the provider device 302 of FIG. 3) may need to identify the length of the BF 416 so that the receiving device may be able to decode the BF properly and identify a Wi-Fi service, Wi-Fi link, and Wi-Fi operation. For example, even if such indications may be included in packets of other types of communications, the inclusion of those indications in a Bluetooth data packet may not result in proper decoding and processing of Bluetooth data packets without the proper combination of information used to inform receiving devices that the data packet is intended for Wi-Fi operations.

In one or more embodiments, the BF 416 elements may be case-sensitive text strings describing the services being offered, searches being discovered, and/or the services being activated. For example, an operation element of a string included in the BF 416 may be defined as shown below in Table 2.

TABLE 2

Operation element of BF 416:

| String | Operation | Description |
| --- | --- | --- |
| a | Device-specific activation | May include a parameter with a BLE address of a provider device intended to be activated |
| b | Browse for a service and request activation of a data link if there is a matching service | Advertised by browsers to indicate they are looking for the specified service. Providers match against this string to determine if an advertisement from a browser is for a service they are providing. This differs from an "s" seek in that Providers activate the data link(s) if there is a match. |
| p | Provider of a service | Advertised by providers if they received an advertisement from a seeker that matches a service they are providing. Seekers also match against this to determine if an advertisement from a provider is for a service they are seeking. |
| s | Seek a service without requesting activation of a matching data link | Advertised by seekers to indicate they are seeking the specified service. Providers match against this to determine if an advertisement from a seeker is for a service they are providing. This differs from a "b" browse in that Providers should not activate the data link(s) based only on this match (but may activate based on other matches, e.g. the "a" activation). |

In one or more embodiments, the BF 416 may include Wi-Fi service indications. In the following examples, "_ipp._tcp" is used as the service name. For a Seeker to discover an ipp service over NAN, it may advertise: s:_ipp._tcp%nan. For a browsing/seeking device to discover an ipp service over NAN, it may advertise: b:_ipp._tcp%nan. For a provider device to respond to a seeker's or browser's advertisement, it would include p:_ipp._tcp%nan. For a seeker to activate the NAN interface of the device that advertised from the BLE address 11:22:33:aa:bb:cc, it would advertise: a;bta=11:22:33:aa:bb:cc:_ipp._tcp%nan. The string included in the BF 416 also may be included by a provider after a data link of the provider has been activated.

In one or more embodiments, the portion 400 may be more flexible than some Bluetooth data packets to account for the BF 416 having a variable length and may cause activation of a Wi-Fi radio/interface at a device. The BLE device address 418 included as a sub-field rather than as an element of the BF 416 may allow devices to identify whether a Bluetooth data packet is intended for the device without having to decode the entire BF 416. The channel information 420 may allow a receiving device to identify a Wi-Fi channel rather than having to scan multiple channels to determine whether a channel is available for Wi-Fi operations. The link status 422 may indicate whether a Wi-Fi link is active or not, and whether the Wi-Fi link has been selected by a seeker device. If the indicated Wi-Fi link has been selected, then a round of messages (e.g., the seeker connect request 314 and the provider connect response 318 of FIG. 3) may be avoided.

Figure 5:
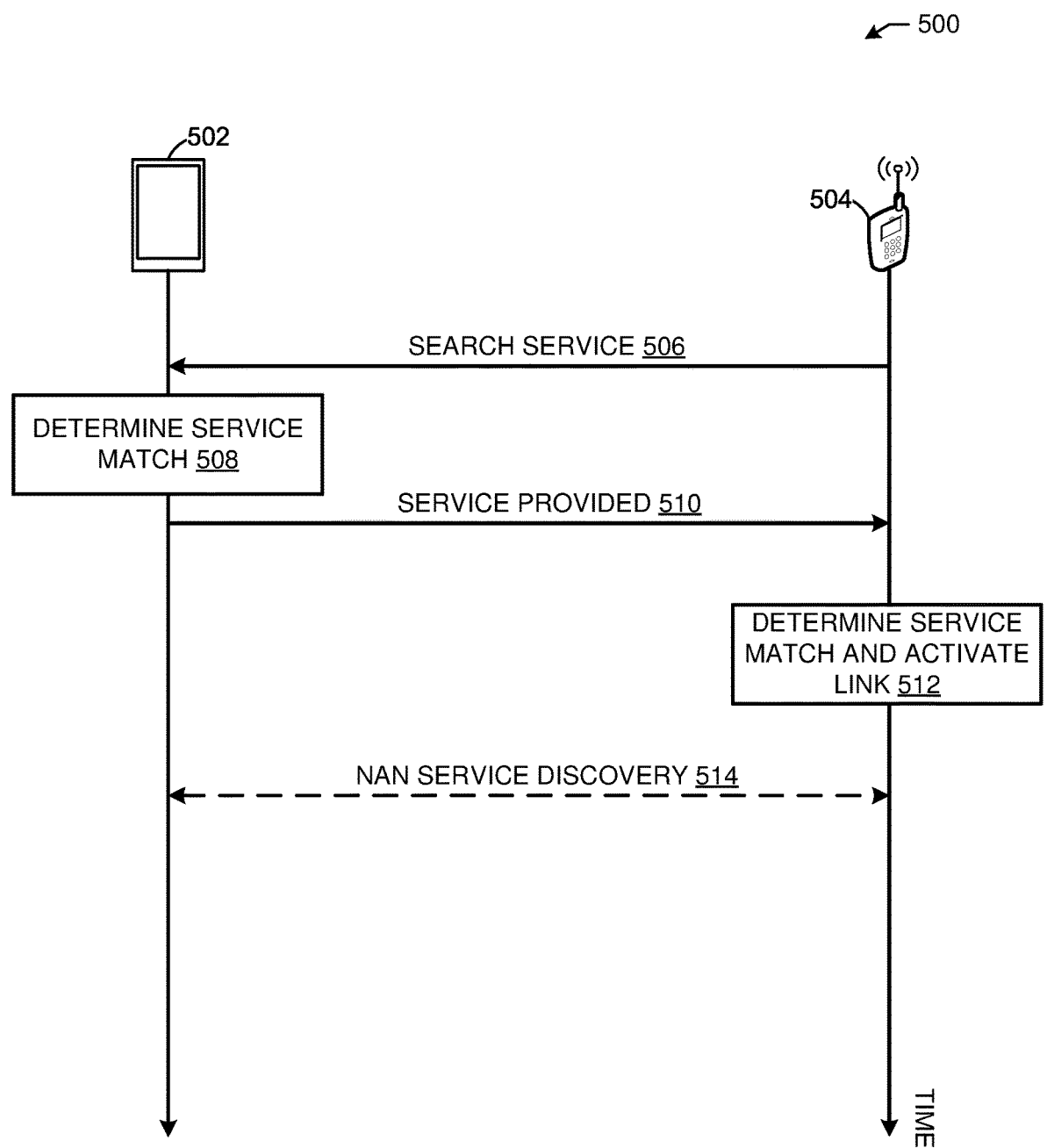
FIG. 5 illustrates an enhanced low-power Wi-Fi service discovery operation, in accordance with one or more example embodiments of the present disclosure.

FIG. 5 illustrates an enhanced low-power Wi-Fi service discovery operation 500, in accordance with one or more example embodiments of the present disclosure.

Referring to FIG. 5, a provider device 502 may establish communication with a seeker device 504 to communicate packets (e.g., frames 140 of FIG. 1) associated with a service. The provider device 502 and the seeker device 504 may be Bluetooth-enabled. The seeker device 504 may send a search service request 506, such as a Bluetooth packet (e.g., a BLE TDS transport discovery data AD packet with the portion 400 of FIG. 4) indicating a service and a type of data link (e.g., a Wi-Fi service and a Wi-Fi data link). At step 508, the provider device 502 may determine a service match and may activate a Wi-Fi interface/radio if not already activated, for example, by identifying a service supported by the provider device 502 and matching a service indicated by the search service request 506. The provider device 502 may send a service provided response 510 to the seeker device 504. The service provided response 510 may indicate that the provider device 502 supports a requested service and data link for the service (e.g., a Wi-Fi service and a Wi-Fi data link). The seeker device 504 may determine, at step 512, that the requested service is matched (e.g., supported by the provider device 502) and may activate a Wi-Fi link of the provider device 502 (e.g., corresponding with the indicated Wi-Fi service). Once the provider device 502 and the seeker device 504 have established a matching Wi-Fi service and data link using Bluetooth packet transmissions, the provider device 502 and seeker device 504 may execute Wi-Fi service discovery at step 514 (e.g., as defined by an IEEE 802.11 standard, a NAN specification, or another Wi-Fi technical specification).

The enhanced low-power Wi-Fi service discovery operation 500 may include a two-way message exchange to shorten BLE discovery time. The provider device 502 may have a Wi-Fi link on/active already. The provider device 502 may include a BF (e.g., the BF 416 of FIG. 4) and link status (e.g., the link status 422 of FIG. 4 indicating that a Wi-Fi link is on) in a responding message (e.g., the service provided response 510). When the seeker device 504 receives the service provided response 510, if a Wi-Fi link is selected, the seeker device 504 may turn on a Wi-Fi interface and initiate Wi-Fi discovery, skipping the third and fourth message exchanges as shown in FIG. 3. However, if the seeker device 504 selects a link that is not on as indicated by the provider device 502, the seeker device 504 may transmit the second round message of FIG. 3 to turn on the corresponding Wi-Fi link on the provider device 504.

It is understood that the above descriptions are for purposes of illustration and are not meant to be limiting.

Figure 6A:
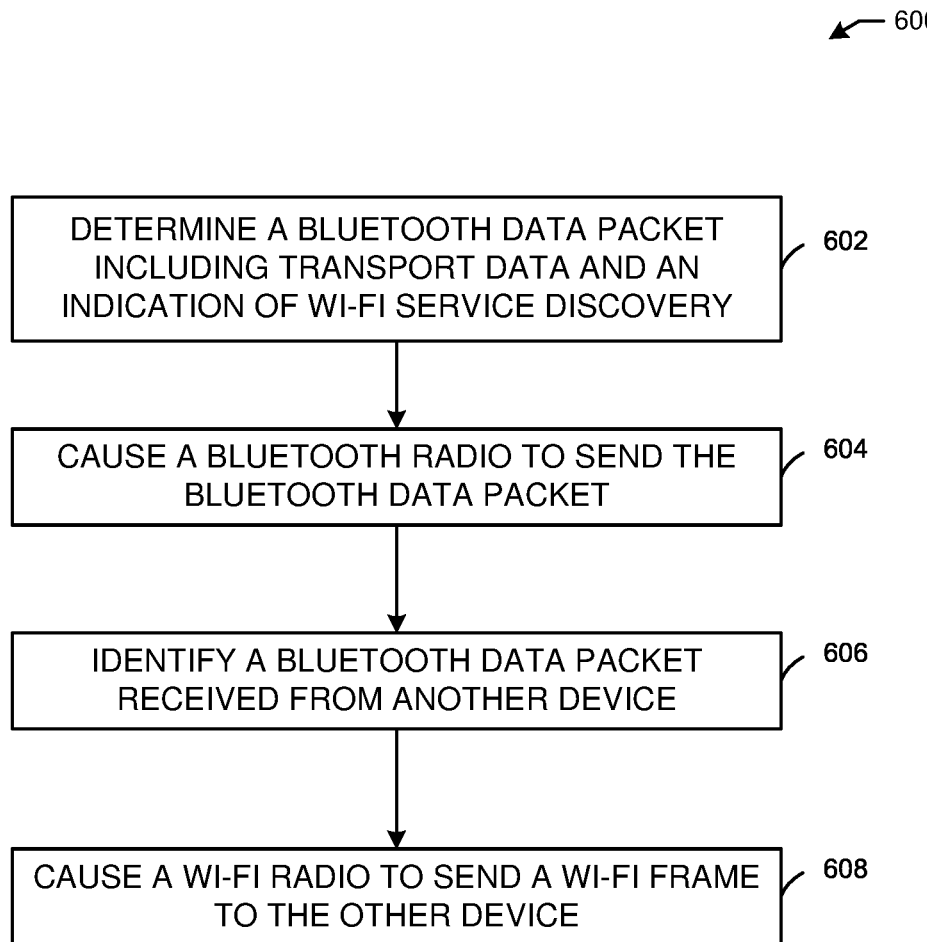
FIG. 6A illustrates a flow diagram of an illustrative process for enhanced Bluetooth triggering of a Wi-Fi radio, in accordance with one or more example embodiments of the present disclosure.

FIG. 6A illustrates a flow diagram of an illustrative process 600 for enhanced Bluetooth triggering of a Wi-Fi radio, in accordance with one or more example embodiments of the present disclosure.

At block 602, one or more processors of a device (e.g., the seeker device 504 of FIG. 5) may determine a Bluetooth data packet (e.g., the search service request 506 of FIG. 5 including the portion 400 of FIG. 4). The data packet may include transport data (e.g., the transport data field 412 of FIG. 4) and an indication of a Wi-Fi service discovery (e.g., the transport discovery AD type code field 404 of FIG. 4), the transport data comprising a first sub-field (e.g., BF length 424 of FIG. 4) and a second sub-field (e.g., BF 416 of FIG. 4), wherein the first sub-field indicates a length of the second sub-field, and wherein the second sub-field indicates one or more Wi-Fi services supported by the device. The Bluetooth data packet may be a BLE TDS packet. The second sub-field may include a name of a Wi-Fi service and a data link identifier. The second sub-field may include an indication of an operation such as publish or subscribe. The second sub-field may indicate one or more operations including at least one of a device-specific activation, a request to activate a data link based on an indication that the Wi-Fi service is supported by the second device, a provider of the Wi-Fi service, or a request for the Wi-Fi service without causing activation of the data link based on an indication that the Wi-Fi service is supported by the second device. The second transport data may include an indication of a BLE address of the device and/or an indication of a channel for Wi-Fi operations. The first sub-field may enable decoding of the second sub-field.

At block 604, the one or more processors of the device may cause a Bluetooth radio to send the Bluetooth data packet, wherein the Bluetooth data packet includes an indication of a Wi-Fi service of the one or more Wi-Fi services. The Wi-Fi service may be a NAN service, a peer-to-peer service, or another type of Wi-Fi service. The Wi-Fi service may be indicated by a BF (e.g., the BF 416 of FIG. 4). Multiple services may be indicated by including multiple sub-fields indicating services.

At block 606, the one or more processors of the device may identify another Bluetooth data packet (e.g., the service provided response 510 of FIG. 5 including the portion 400 of FIG. 4) received by the Bluetooth radio from a second device (e.g., the provider device 502 of FIG. 5) in response to the Bluetooth data packet. The Bluetooth data packet may indicate that the Wi-Fi service is supported by the second device (e.g., the Bluetooth data packet may include the BF 416 of FIG. 4, which may include the service name indicated in the Bluetooth data packet). The device may activate a Wi-Fi radio/interface associated with the requested/supported Wi-Fi service.

At block 608, the one or more processors of the device may cause the device to send one or more Wi-Fi frames to the second device, wherein the one or more Wi-Fi frames are associated with the Wi-Fi service. The Wi-Fi frames may be sent as part of a Wi-Fi service discovery and/or as part of the service once the device has established any appropriate links and interfaces used to communicate the Wi-Fi service data.

Figure 6B:
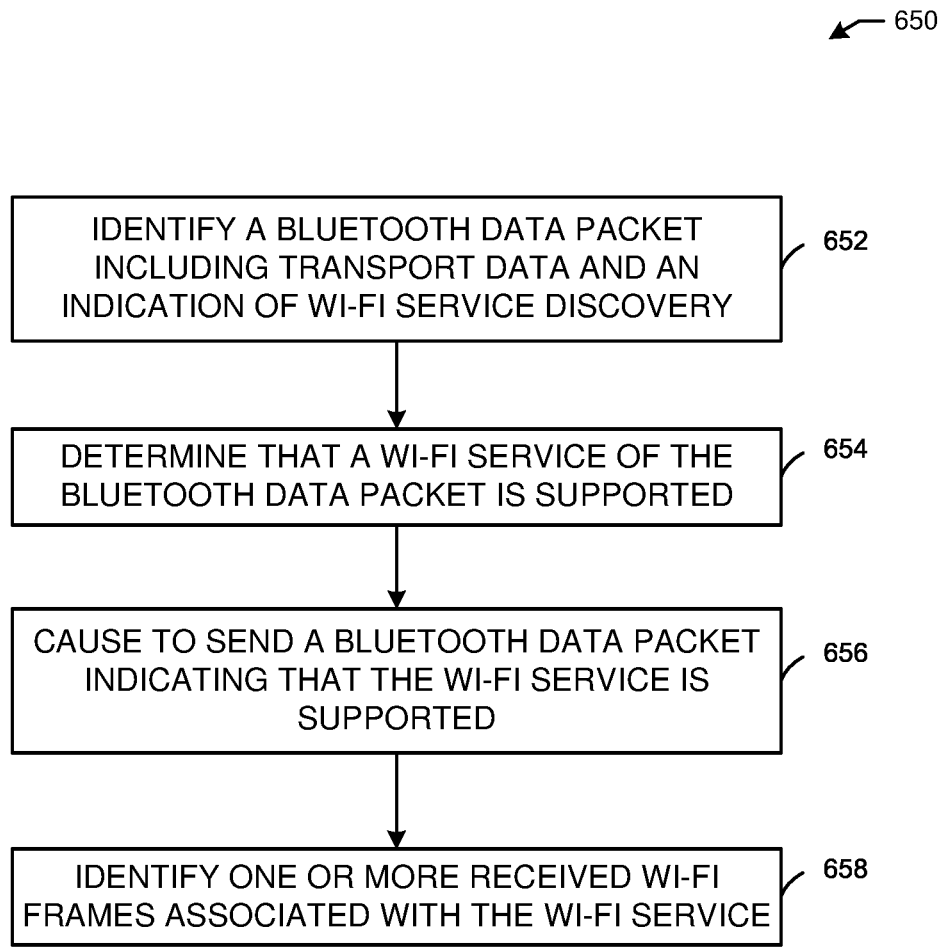
FIG. 6B illustrates a flow diagram of an illustrative process for enhanced Bluetooth triggering of a Wi-Fi radio, in accordance with one or more example embodiments of the present disclosure.

FIG. 6B illustrates a flow diagram of an illustrative process 650 for enhanced Bluetooth triggering of a Wi-Fi radio, in accordance with one or more example embodiments of the present disclosure.

At block 652, one or more processors for a device (e.g., AP provider device 502 of FIG. 5) may identify a Bluetooth data packet (e.g., a search service request 506 of FIG. 5 including the portion 400 of FIG. 4) received from another device (e.g., the seeker device 504 of FIG. 5). The Bluetooth data packet may include transport data (e.g., the transport data field 412 of FIG. 4) and an indication of a Wi-Fi service discovery (e.g., the transport discovery AD type code field 404 of FIG. 4), the transport data comprising a first sub-field (e.g., the BF field length 424 of FIG. 4) and a second sub-field (e.g., the BF 416 of FIG. 4), wherein the first sub-field indicates a length of the second sub-field, and wherein the second sub-field indicates one or more Wi-Fi services supported by the device.

At block 654, the one or more processors for the device may determine that the Wi-Fi service in the Bluetooth data packet is supported by the device. For example, the Bluetooth data packet may indicate one or more services using a BF (e.g., the BF 416 of FIG. 4), and may use a service hash to determine whether any indicated Wi-Fi services are supported by the device (e.g., based on a string indicating a Wi-Fi service name).

At block 656, the one or more processors for the device may cause to send a Bluetooth data packet to the other device (e.g., using a BLE address of the other device indicated by the received Bluetooth data packet). The sent Bluetooth data packet may indicate (e.g., using the BF 416 of FIG. 4) that the device supports one or more of the services indicated by the received Bluetooth data packet from the other device. The sent Bluetooth data packet may use text strings indicating matching services and data links.

At block 658, the one or more processors for the device may identify one or more Wi-Fi frames received using a Wi-Fi radio and sent by a Wi-Fi radio of the other device. The device may send Wi-Fi frames using a Wi-Fi radio. The Wi-Fi frames may be sent and received based on a matching Wi-Fi service. For example, the Wi-Fi frames may be exchanged as part of a Wi-Fi service discovery and/or as part of a Wi-Fi service after Wi-Fi service discovery has been performed.

It is understood that the above descriptions are for purposes of illustration and are not meant to be limiting FIG. 7 shows a functional diagram of an exemplary communication station 700 in accordance with some embodiments.

In one embodiment, FIG. 7 illustrates a functional block diagram of a communication station that may be suitable for use as a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASIC s), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced activation device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced activation device 819 may carry out or perform any of the operations and processes (e.g., process 600 of FIG. 6A and process 650 of FIG. 6B) described and shown above.

In one or more embodiments, the enhanced activation device 819 may send a service discovery request using a Bluetooth data packet (e.g., an enhanced BLE TDS AD packet modified for Wi-Fi communications) indicating one or more requested Wi-Fi service names and associated types of data links (e.g., NAN, peer-to-peer, or another type of data link) for the services. A provider device may receive the data packet and determine that the service name is supported by the provider device. The provider device may respond by sending a Bluetooth data packet indicating one or more matching services (e.g., services indicated in the service discovery request and supported by the provider device) and supported data links for the services. The seeker device may send a seeker connect Bluetooth data packet indicating one or more services and data links, and including the Bluetooth device address of the provider device so that the provider device may identify that the seeker connect packet is intended for that provider device. The provider device may activate an interface for the service/data link (e.g., if the service and data link are NAN, the provider device may activate a NAN interface). The provider device may send a provider connect response data packet indicating the service, data link, and the Bluetooth device address of the seeker device. The seeker device may activate an interface for the service/data link (e.g., if the service and data link are NAN, the provider device may activate a NAN interface). Once the Wi-Fi radios and interfaces on the seeker and provider devices are activated for a service, the seeker and provider devices may exchange service discovery request and response frames in a Wi-Fi service discovery process as defined by the IEEE 802.11 technical standards (e.g., a NAN service discovery process).

It is understood that the above are only a subset of what the enhanced activation device 819 may be configured to perform and that other functions included throughout this disclosure may also be performed by the enhanced activation device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising storage coupled to processing circuitry, the processing circuitry configured to: determine a first Bluetooth data packet, wherein the first Bluetooth data packet comprises transport data and an indication of a Wi-Fi service discovery, the transport data comprising a first sub-field and a second sub-field, wherein the first sub-field indicates a length of the second sub-field, and wherein the second sub-field indicates one or more Wi-Fi services supported by the device; cause a Bluetooth radio to send the first Bluetooth data packet, wherein the first Bluetooth data packet comprises an indication of a Wi-Fi service of the one or more Wi-Fi services; identify a second Bluetooth data packet received by the Bluetooth radio from a second device in response to the first Bluetooth data packet, wherein the second device is different from the device, and wherein the second Bluetooth data packet indicates that the Wi-Fi service is supported by the second device; and cause a Wi-Fi radio of the device to send one or more Wi-Fi frames to the second device, wherein the one or more Wi-Fi frames are associated with the Wi-Fi service.

Example 2 may include the device of example 1, wherein the first Bluetooth data packet is a Bluetooth Low Energy (BLE) Transport Discovery Service (TDS) packet.

Example 3 may include the device of example 1 and/or some other example herein, wherein the second sub-field comprises a name of the Wi-Fi service and a data link identifier.

Example 4 may include the device of example 1 and/or some other example herein, wherein the second sub-field comprises an indication of a publish operation or a subscribe operation.

Example 5 may include the device of example 1 and/or some other example herein, wherein the second sub-field indicates one or more operations, the one or more operations comprising at least one of a device-specific activation, a request to activate a data link based on an indication that the Wi-Fi service is supported by the second device, a provider of the Wi-Fi service, or a request for the Wi-Fi service without causing activation of the data link based on an indication that the Wi-Fi service is supported by the second device.

Example 6 may include the device of example 1 and/or some other example herein, wherein the transport data further comprises an indication of a BLE address associated with the device.

Example 7 may include the device of example 1 and/or some other example herein, wherein the transport data further comprises an indication of channel information associated with the Wi-Fi service.

Example 8 may include the device of example 1 and/or some other example herein, wherein the processing circuitry is further configured to activate a neighbor awareness networking (NAN) interface in response to identifying the second Bluetooth data packet.

Example 9 may include the device of example 1 and/or some other example herein, wherein the processing circuitry is further configured to activate a Wi-Fi Direct interface in response to identifying the second Bluetooth data packet.

Example 10 may include the device of example 1 and/or some other example herein, wherein the processing circuitry is further configured to activate a Wi-Fi infrastructure interface in response to identifying the second Bluetooth data packet.

Example 11 may include the device of example 1 and/or some other example herein, wherein the processing circuitry is further configured to activate a Wi-Fi interface in response to identifying the second Bluetooth data packet, wherein the Wi-Fi interface is associated with operating the device in a 60 GHz frequency band.

Example 12 may include the device of example 1 and/or some other example herein, wherein the processing circuitry is further configured to activate a Wi-Fi interface in response to identifying the second Bluetooth data packet, wherein the Wi-Fi interface is associated with operating the device in a sub-1 GHz frequency band.

Example 13 may include the device of example 1 and/or some other example herein, wherein the first sub-field enables decoding of the second sub-field.

Example 14 may include the device of example 1 and/or some other example herein, further comprising a transceiver configured to send and receive wireless signals.

Example 15 may include the device of example 14 and/or some other example herein, further comprising one or more antennas coupled to the transceiver.

Example 16 may include a non-transitory computer-readable medium storing computer-executable instructions which when executed by one or more processors result in performing operations comprising: identifying, by a first device, a first Bluetooth data packet received from a second device using a Bluetooth radio, wherein the first Bluetooth data packet comprises transport data and an indication of a Wi-Fi service discovery, the transport data comprising a first sub-field and a second sub-field, wherein the first sub-field indicates a length of the second sub-field, and wherein the second sub-field indicates one or more Wi-Fi services supported by the first device; determining that the first device supports a Wi-Fi service of the one or more Wi-Fi services; cause the Bluetooth radio to send a second Bluetooth data packet to the first device, wherein the second Bluetooth data packet comprises an indication that the first device supports the Wi-Fi service; and identify one or more Wi-Fi frames received from the second device using a Wi-Fi radio, wherein the one or more Wi-Fi frames are associated with the Wi-Fi service.

Example 17 may include the non-transitory computer-readable medium of example 16, wherein the second sub-field comprises a name of the Wi-Fi service and a data link identifier.

Example 18 may include the non-transitory computer-readable medium of example 16 and/or some other example herein, wherein the second sub-field comprises an indication of a publish operation or a subscribe operation.

Example 19 may include the non-transitory computer-readable medium of example 16 and/or some other example herein, wherein the transport data further comprises an indication of channel information associated with the Wi-Fi service.

Example 20 may include an apparatus comprising means for: determining, by processing circuitry of a first device a first Bluetooth data packet, wherein the first Bluetooth data packet comprises transport data and an indication of a Wi-Fi service discovery, the transport data comprising a first sub-field and a second sub-field, wherein the first sub-field indicates a length of the second sub-field, and wherein the second sub-field indicates one or more Wi-Fi services supported by the device; causing a Bluetooth radio to send, by the processing circuitry, the first Bluetooth data packet, wherein the first Bluetooth data packet comprises an indication of a Wi-Fi service of the one or more Wi-Fi services; identifying, by the processing circuitry, a second Bluetooth data packet received by the Bluetooth radio from a second device in response to the first Bluetooth data packet, wherein the second device is different from the first device, and wherein the second Bluetooth data packet indicates that the Wi-Fi service is supported by the second device; and causing a Wi-Fi radio of the first device to send, by the processing circuitry, one or more Wi-Fi frames to the second device, wherein the one or more Wi-Fi frames are associated with the Wi-Fi service.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-21, or any other method or process described herein.

Example 23 may include a method, technique, or process as described in or related to any of examples 1-21, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the invention are in particular disclosed in the attached claims directed to a method, a storage medium, a device and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
generate a first Bluetooth® low energy (BLE) packet, wherein the first BLE packet comprises transport data and an indication of a Wi-Fi service discovery, the transport data comprising a first sub-field indicating a length of a second sub-field, wherein the second sub-field is a first bloom filter comprising a first text string associated with a Wi-Fi service that is seeked;
advertise the first BLE packet using a Bluetooth radio, wherein the first text string is set to represent a Wi-Fi operation, Wi-Fi service, and a Wi-Fi service link;
identify a second BLE packet received by the Bluetooth radio from a second device in response to the first BLE packet, wherein the second BLE packet comprises a second bloom filter comprising a second text string that indicates that the second device is a provider of the Wi-Fi service, and wherein the second BLE packet comprises a Bluetooth device address identifying the second device; and
activate a Wi-Fi radio associated with the device based on identifying the second device is the provider of the Wi-Fi service.

2. The device of claim 1, wherein the first text string and the second text string have a format of "operation element: service name%data link identifier."

3. The device of claim 2, wherein the processing circuitry is further configured to set the operation element of the first string or the second string to "b" to indicate an operation to browse for a service and request activation of a data link if there is a matching service.

4. The device of claim 2, wherein the processing circuitry is further configured to set the operation element of the first string or the second string to "p" to indicate a provider of service.

5. The device of claim 2, wherein the processing circuitry is further configured to set the operation element of the first string or the second string to "s" to indicate seeking a service without requesting activation of a matching data link.

6. The device of claim 1, wherein the first string and second string are case sensitive.

7. The device of claim 1, wherein the first BLE packet is a BLE Transport Discovery Service (TDS) packet.

8. The device of claim 1, wherein the second sub-field indicates one or more operations, the one or more operations comprising at least one of a device-specific activation, a request to activate a data link based on an indication that the Wi-Fi service is supported by the second device, a provider of the Wi-Fi service, or a request for the Wi-Fi service without causing activation of the data link based on an indication that the Wi-Fi service is supported by the second device.

9. The device of claim 8, wherein the device-specific activation comprises a parameter with a BLE address of a provider device intended to be activated.

10. A non-transitory computer-readable medium storing computer-executable instructions which when executed by one or more processors result in performing operations comprising:
generating a first Bluetooth® low energy (BLE) packet, wherein the first BLE packet comprises transport data and an indication of a Wi-Fi service discovery, the transport data comprising a first sub-field indicating a length of a second sub-field, wherein the second sub-field is a first bloom filter comprising a first text string associated with a Wi-Fi service that is seeked;
advertise the first BLE packet using a Bluetooth radio, wherein the first text string is set to represent a Wi-Fi operation, Wi-Fi service, and a Wi-Fi service link;
identifying a second BLE packet received by the Bluetooth radio from a second device in response to the first BLE packet, wherein the second BLE packet comprises a second bloom filter comprising a second text string that indicates that the second device is a provider of the Wi-Fi service, and wherein the second BLE packet comprises a Bluetooth device address identifying the second device; and
activate a Wi-Fi radio associated with the device based on identifying the second device is the provider of the Wi-Fi service.

11. The non-transitory computer-readable medium of claim 10, wherein the first text string and the second text string have a format of "operation element:service name%data link identifier."

12. The non-transitory computer-readable medium of claim 11, wherein the operations further comprise setting the operation element of the first string or the second string to "b" to indicate an operation to browse for a service and request activation of a data link if there is a matching service.

13. The non-transitory computer-readable medium of claim 11, wherein the operations further comprise setting the operation element of the first string or the second string to "p" to indicate a provider of service.

14. The non-transitory computer-readable medium of claim 11, wherein the operations further comprise setting the operation element of the first string or the second string to "s" to indicate seeking a service without requesting activation of a matching data link.

15. The non-transitory computer-readable medium of claim 10, wherein the first string and second string are case sensitive.

16. The non-transitory computer-readable medium of claim 10, wherein the first BLE packet is a BLE Transport Discovery Service (TDS) packet.

17. The non-transitory computer-readable medium of claim 10, wherein the second sub-field indicates one or more operations, the one or more operations comprising at least one of a device-specific activation, a request to activate a data link based on an indication that the Wi-Fi service is supported by the second device, a provider of the Wi-Fi service, or a request for the Wi-Fi service without causing activation of the data link based on an indication that the Wi-Fi service is supported by the second device.

18. The non-transitory computer-readable medium of claim 17, wherein the device-specific activation comprises a parameter with a BLE address of a provider device intended to be activated.

19. A method comprising:
   generating a first Bluetooth® low energy (BLE) packet, wherein the first BLE packet comprises transport data and an indication of a Wi-Fi service discovery, the transport data comprising a first sub-field indicating a length of a second sub-field, wherein the second sub-field is a first bloom filter comprising a first text string associated with a Wi-Fi service that is seeked;
   advertise the first BLE packet using a Bluetooth radio, wherein the first text string is set to represent a Wi-Fi operation, Wi-Fi service, and a Wi-Fi service link;
   identifying a second BLE packet received by the Bluetooth radio from a second device in response to the first BLE packet, wherein the second BLE packet comprises a second bloom filter comprising a second text string that indicates that the second device is a provider of the Wi-Fi service, and wherein the second BLE packet comprises a Bluetooth device address identifying the second device; and
   activate a Wi-Fi radio associated with the device based on identifying the second device is the provider of the Wi-Fi service.

20. The method of claim 19, wherein the first text string and the second text string have a format of "operation element:service name%data link identifier."

* * * * *